(12) United States Patent
Hedley (10) Patent No.: US 9,447,638 B2
(45) Date of Patent: Sep. 20, 2016

(54) ACCESS DEVICE (75) Inventor: Robert Ian Hedley, Buttaba (AU)

(73) Assignee: JUSTOY PTY LTD (AU)

( * ) Notice: Subject to any disclaimer, the term of this patent is extended or adjusted under 35 U.S.C. 154(b) by 0 days.

(21) Appl. No.: 13/521,020

(22) PCT Filed: Feb. 16, 2011

(86) PCT No.: PCT/AU2011/000166
§ 371 (c)(1),
(2), (4) Date: Jul. 6, 2012

(87) PCT Pub. No.: WO2011/100794
PCT Pub. Date: Aug. 25, 2011

(65) Prior Publication Data
US 2013/0008743 A1    Jan. 10, 2013

(30) Foreign Application Priority Data

Feb. 17, 2010    (AU) ................ 2010900652

(51) Int. Cl.
*B63B 27/14*    (2006.01)
*E06C 5/00*    (2006.01)
(Continued)

(52) U.S. Cl.
CPC . *E06C 7/183* (2013.01); *B60R 3/02* (2013.01); *B63B 27/14* (2013.01); *E02F 9/0833* (2013.01); *E06C 1/393* (2013.01); *E06C 5/02* (2013.01); *E06C 5/06* (2013.01); *E06C 9/08* (2013.01); *B60R 3/005* (2013.01); *E04F 11/06* (2013.01); *E06C 7/181* (2013.01)

(58) Field of Classification Search
CPC ............... E06C 5/04; E06C 9/08; E06C 9/06; E06C 9/085; E06C 5/06; E06C 5/02; E06C 1/393; E02F 9/0833; B64C 1/24; B64C 1/22; E04F 11/06; E04F 11/062; B62D 33/0273; B63B 27/14; B63B 27/146; B61D 23/02; B60R 3/02; B60R 3/0005; B60R 3/0007
USPC ........... 182/82, 86, 93, 95, 97, 106, 113, 127, 182/129
See application file for complete search history.

(56) References Cited

U.S. PATENT DOCUMENTS 2,531,263 A * 11/1950 Fink et al. ................ 182/97
2,933,149 A *  4/1960 Lee .................................. 182/78
(Continued)

FOREIGN PATENT DOCUMENTS

AU           738307       * 12/1996
AU       2003200356 A1      8/2003

*Primary Examiner* — Daniel Cahn
(74) *Attorney, Agent, or Firm* — Kilpatrick Townsend & Stockton LLP (57) ABSTRACT

An access device that provides access between a substrate surface and an elevated surface includes a first ladder member that is operatively attached to a mounting via a drive mechanism. The drive mechanism includes a rotatable member having three pivotal connectors spaced apart in a triangular arrangement. A first of the connectors is pivotally attached to the mounting. A second of the connectors is pivotally attached to the first ladder member via a control arm. A third of the connectors is pivotally attached to an extremity of the mounting via an extendible arm. The extendible arm causes the rotatable member to rotate about the first connector, and consequently effect movement of the access device. The access device further includes a second ladder member, a first end of which is pivotally attached to a second end of the first ladder member.

10 Claims, 9 Drawing Sheets

(51) Int. Cl.
*E06C 7/18* (2006.01)
*E06C 5/06* (2006.01)
*B60R 3/02* (2006.01)
*E02F 9/08* (2006.01)
*E06C 1/393* (2006.01)
*E06C 5/02* (2006.01)
*E06C 9/08* (2006.01)
*B60R 3/00* (2006.01)
*E04F 11/06* (2006.01)

(56) References Cited

U.S. PATENT DOCUMENTS

| | | | | |
|---|---|---|---|---|
| 4,014,486 | A | * | 3/1977 | Nelson et al. .............. 244/129.6 |
| 5,584,493 | A | * | 12/1996 | Demski .................... B60R 3/02 105/445 |
| 5,988,316 | A | * | 11/1999 | Hedley .................... B60R 3/02 182/127 |
| 6,068,277 | A | * | 5/2000 | Magnussen ........... E02F 9/0833 182/127 |
| 6,347,686 | B1 | * | 2/2002 | Hedley .................... B60R 3/02 182/127 |
| 2003/0173153 | A1 | * | 9/2003 | Hedley ........................ 182/97 |
| 2005/0092551 | A1 | * | 5/2005 | Caldwell ..................... 182/204 |
| 2009/0038885 | A1 | * | 2/2009 | Ellement .................. E06C 5/06 182/97 |
| 2012/0145480 | A1 | * | 6/2012 | Willis ...................... E06C 5/06 182/106 |
| 2012/0205195 | A1 | * | 8/2012 | Tsutsumi ............. E02F 9/0833 182/106 |
| 2013/0048400 | A1 | * | 2/2013 | Holdener ................ B60R 3/02 180/89.1 |
| 2013/0092474 | A1 | * | 4/2013 | Magnussen ............. E06C 5/36 182/127 |
| 2013/0118832 | A1 | * | 5/2013 | Hedley .................... E06C 5/02 182/106 |

* cited by examiner

ACCESS DEVICE

BACKGROUND OF THE INVENTION

The present invention relates to an access device, and in particular, to an access device for providing access between a substrate surface and ran elevated surface, and which is movable between an access position and a storage position.

The device has a pair of ladder members, which in the access position, extend generally outwardly and downwardly from the elevated surface. In the storage position, the ladder members are retracted in a substantially vertically disposed manner atop a mounting.

The access device of the present invention is particularly useful for mounting atop an elevated platform of a vehicle such as a mining, earthmoving or railway vehicle.

DESCRIPTION OF THE PRIOR ART

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

When providing an access device, for access between a substrate surface and an elevated surface on a vehicle, such as a mining, earthmoving or railway vehicle, the access device needs to be provided such that, in its stowed position, it does not interfere with the normal operation of the vehicle, whilst, in its access position, it provides easy access between the substrate surface and the elevated surface.

In some vehicles, it is desired not to have the access device outwardly extending from the extremities of a vehicle at all, as this can interfere with the normal operation of the vehicle. In such situations, the access device is more preferably provided atop the elevated surface of the vehicle.

In the access position, the device is preferably required to be disposed within a certain range of angles, typically between 60° and 75°, and perhaps most optimally at 62°. This is to provide for ease of use by the user, and, to conform with occupational health and safety requirements. The device preferably also incorporates handrails, to assist the user when climbing up or down the device.

SUMMARY OF THE INVENTION

The present invention seeks to provide an access device for providing access between a substrate surface and an elevated surface.

The present invention also seeks to provide an access device which is movable between an access position and a storage position. In the access position, the access device has first and second ladder members which are substantially coaligned and extend angularly outwardly and downwardly from the elevated surface. In a storage position, each of the first and second ladder members is retracted to a position substantially atop the mounting on the elevated surface.

In one broad form, the present invention provides an access device, adapted to provide access between a substrate surface and an elevated surface, including:

a mounting, for securement of said device substantially atop said elevated surface;

a first ladder member, a first end of which is pivotally attached to said mounting;

a second ladder member, a first end of which is pivotally attached to a second end of said first ladder member, at an articulation joint;

drive means, operatively connected between said mounting and said first ladder member, to control the movement of said first ladder member between an access position and a storage position;

at least one guide arm, operatively connected between said mounting and said articulation joint, to guide the movement of said second ladder member as said drive means moves said first ladder member;

whereby, user operation of said drive means controls the operation of said access device between an access position and a storage position, in which, in said access position, each of said first and second ladder members are substantially coaligned and extend substantially outwardly and downwardly from said elevated surface, and, in said storage position, each of said first and second ladder members are retracted in a substantially vertically disposed manner substantially atop said mounting.

Preferably, said drive means includes:

a rotatable member having three pivotal connectors spaced apart in a triangular arrangement;

a first of said connectors being pivotally attached to said mounting;

a second of said connectors being pivotally attached to said first ladder member via a control arm; and, a third of said connectors being pivotally attached to an extremity of said mounting via an extendible arm;

whereby, contraction or extension of said extendable arm is effected to thereby cause said rotatable member to rotate about said first connector, sand consequently effect movement of said access device between said access and storage positions.

Also preferably, the access device further includes a handrail attached to said guide arm(s).

Preferably, said drive means includes a hydraulic, pneumatic or electric cylinder.

Also preferably, said device is attached to a mining, earthmoving, railway or like vehicle.

Also preferably, in said access position, said ladder members are each disposed at between 60° and 75°, and most preferably at 62°, relative to said substrate surface.

BRIEF DESCRIPTION OF THE DRAWINGS

The present invention will become more fully understood from the following detailed description of preferred but non-limiting embodiments thereof, described in connection with the accompanying drawings, wherein.

DETAILED DESCRIPTION OF PREFERRED EMBODIMENTS

Throughout the drawings, like numerals will be used to identify similar features except where expressly otherwise indicated.

The access device, generally designated by the numeral 1 is for providing access between a substrate surface 2 and an elevated surface 3. The device includes a mounting 4 a first ladder member 5, a second ladder member 6, a drive means 7 and guide arms 8.

The mounting 4 is for securement of the access device 1 on an elevated surface 3 (not shown). The elevated surface may be the platform of a vehicle such as, a mining, earthmoving, railway, or other vehicle.

Figure 2:
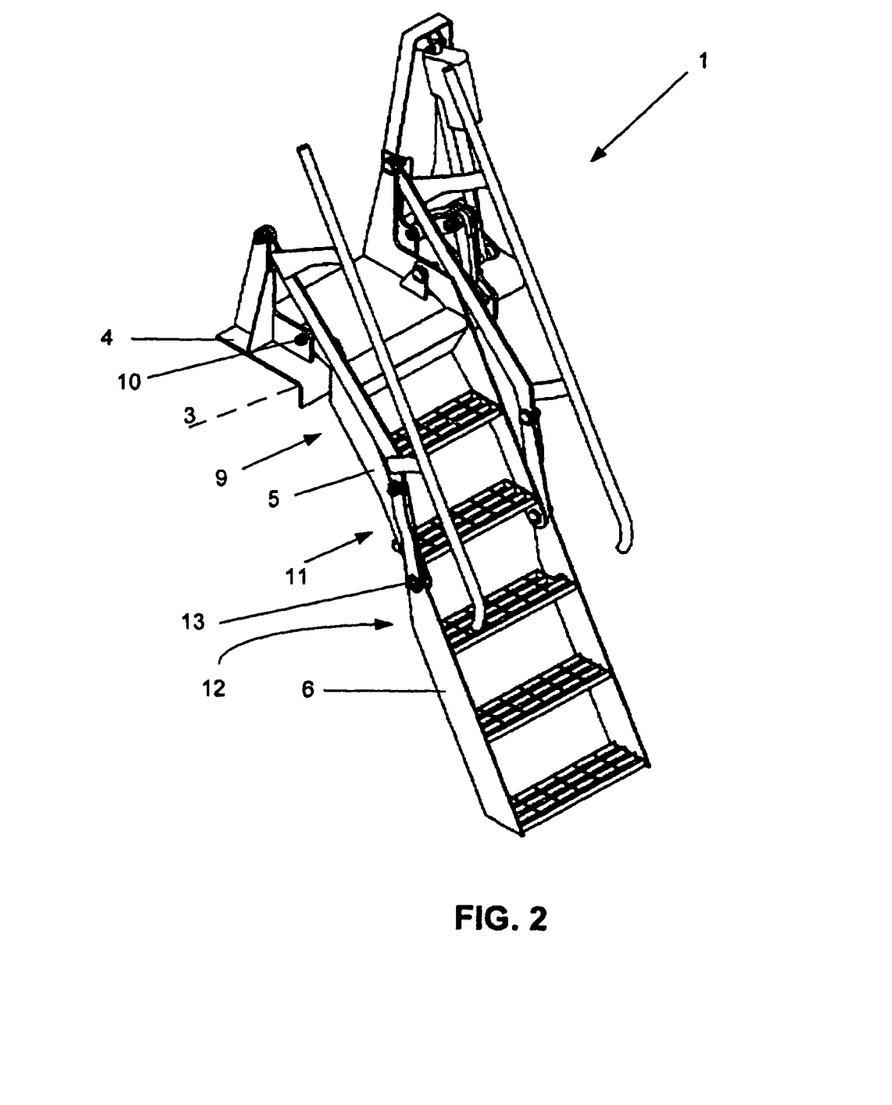
FIG. 2 shows an alternative perspective view, from the other side, of the access device of FIG. 1.
Figures 7A, 7B:
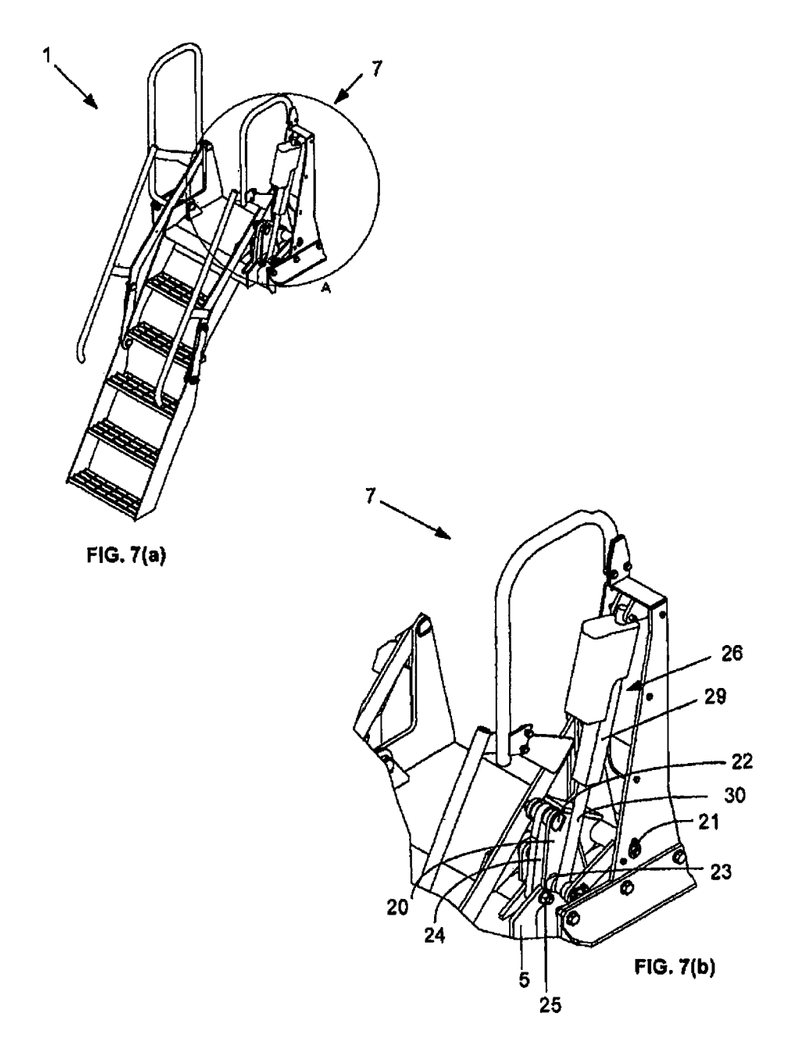
FIG. 7(a) illustrates a perspective view of the access device in the access position.
FIG. 7(b) detailing the drive means of the portion of the access device encircled and labelled A in FIG. 7(a)
Figure 8A:
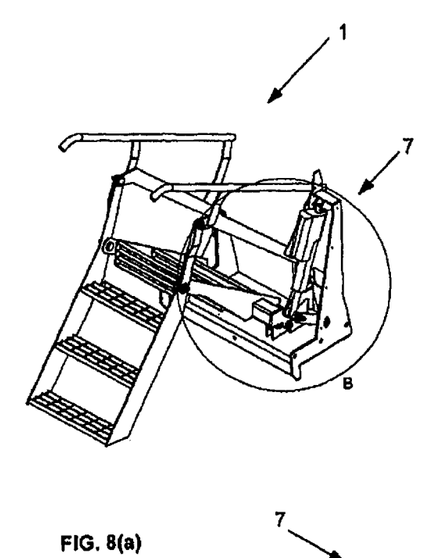
FIG. 8(a) illustrates a perspective view of the access drive in the 'intermediate' position, FIG. 8(b) detailing the drive means encircled and labelled B in FIG. 8(a)
Figure 9A:
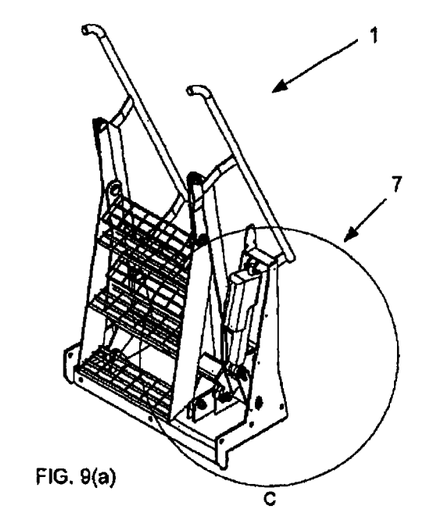
FIG. 9(a) illustrates a perspective view of the access device in the retracted position, and in FIG. 9(b), a detailed view of the drive portion of the portion of the access encircled and labelled C in FIG. 9(a).

A first end 9 (see FIG. 2) of the first ladder member 5 is pivotally attached to the mounting 4 at pivotal connection 10. A second end 11 of the first ladder member 5 is pivotally attached to a first end 12 of the second ladder member 6, at pivotal connection 13. The drive means 7 is operatively connected between the mounting 4 and the first ladder member 5, as will be hereinafter described, to control the movement of the first ladder member 5 between its access position, as shown in FIG. 7, and, its storage position, as shown in FIG. 9. FIG. 8 illustrates an intermediate position of the device, intermediate the access position of FIG. 7, and the storage position of FIG. 9.

Figure 1:
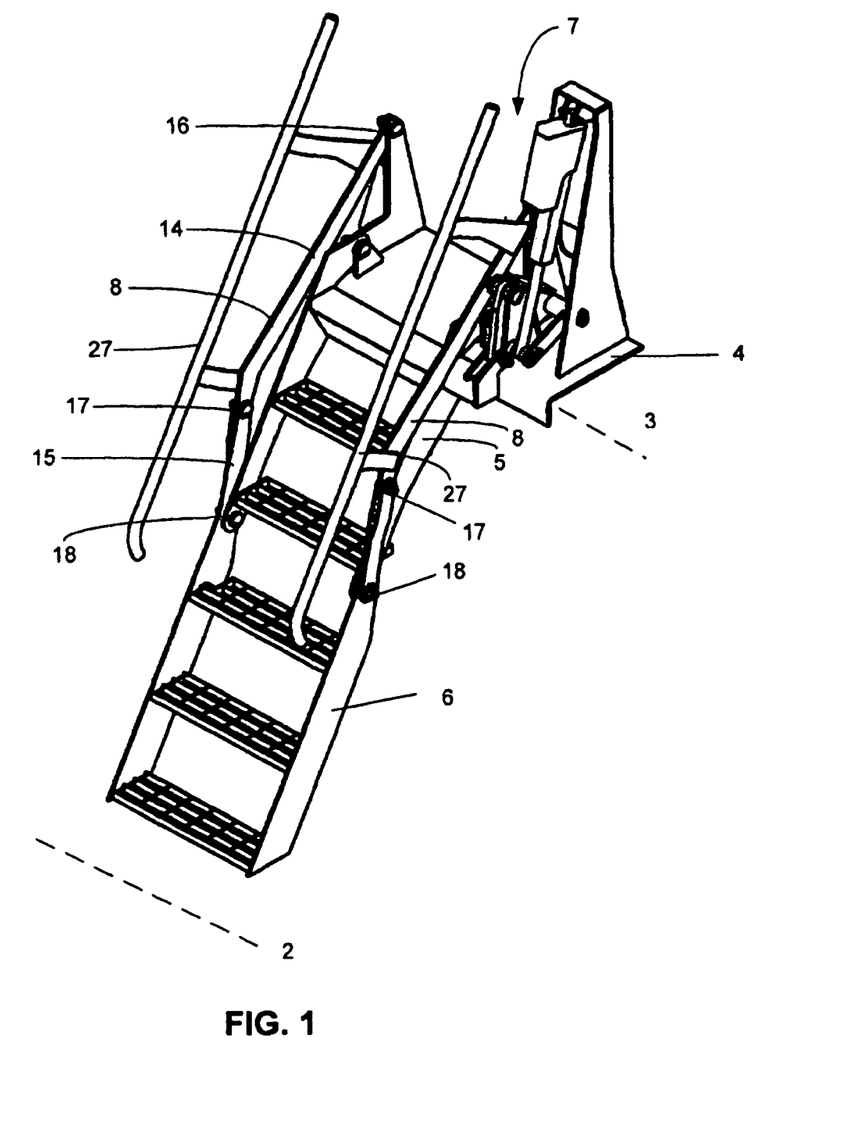
FIG. 1 shows a perspective view of the access device in accordance with the preferred embodiment of the present invention.

A pair of guide arms 8 are shown operatively connected between the mounting 4 and the second ladder member 6. The guide arms 8 are shown having a first guide arm member 14 (see FIG. 1) which is pivotally connected to the mounting 4 at pivot point 16, and a second guide arm member 15, which is pivotally connected to the first guide arm member 14 at pivot point 17, and, pivotally connected to the second ladder member 6 at a pivot point or articulation point 18, being the articulation point between the first ladder member 5 and the second ladder member 6.

It will therefore be understood that, upon operation of the drive means 7 by a user, first ladder member 5 moves. As this movement occurs, guide arms 8, including guide members 14 and 15 control or guide the movement of the second ladder member 6 between the access position and the storage position.

Figure 4:
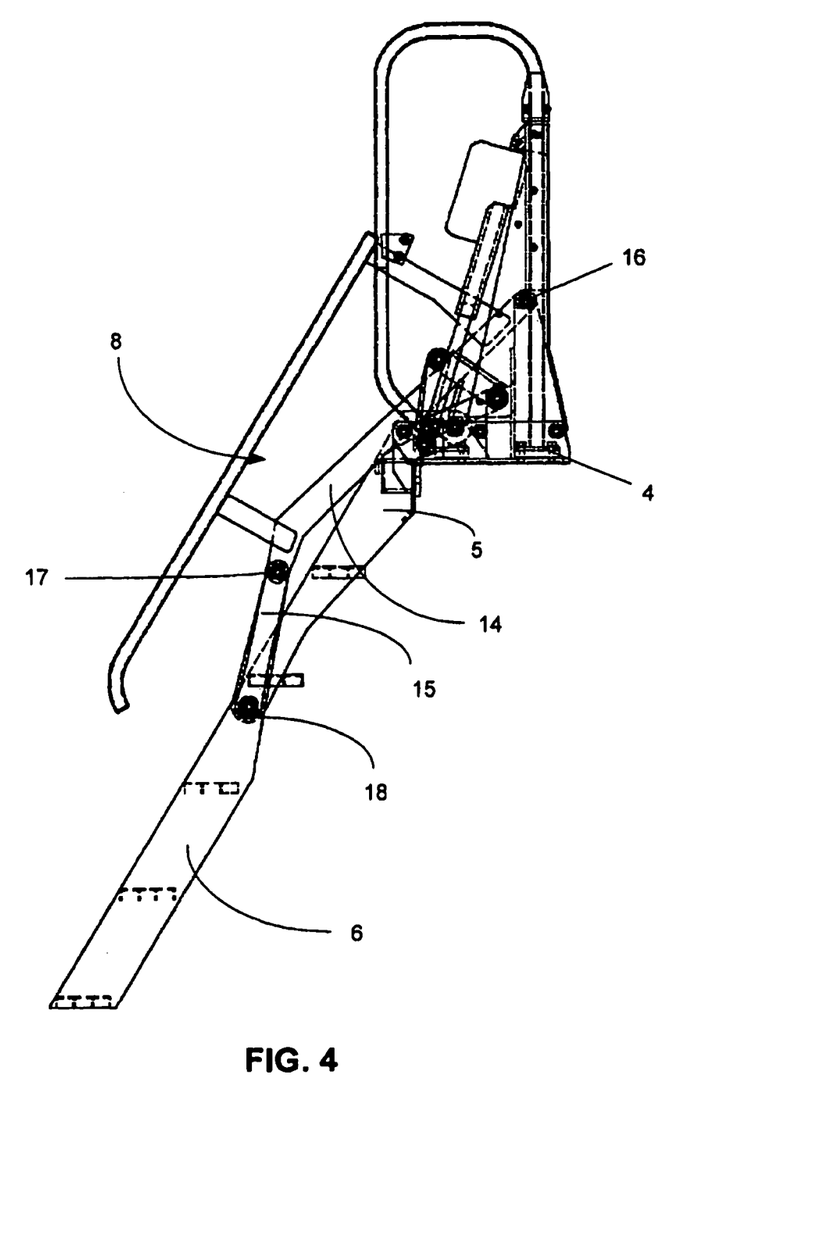
FIG. 4 illustrates a side view of the access device of FIGS. 3(a)-3(d) in the 'access' position.

In the access position, as illustrated in FIGS. 4 and 7, each of the first and second ladder members 5 and 6 are substantially coaligned and extend angularly outwardly and downwardly from the elevated surface 3.

Figure 5:
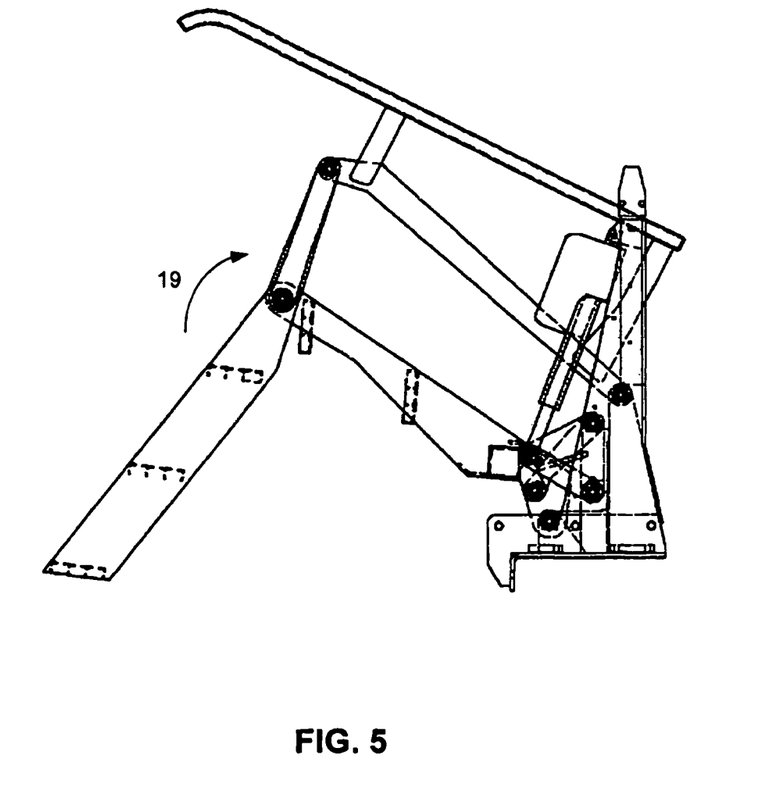
FIG. 5 illustrates the access device in an 'intermediate' position.
Figure 6:
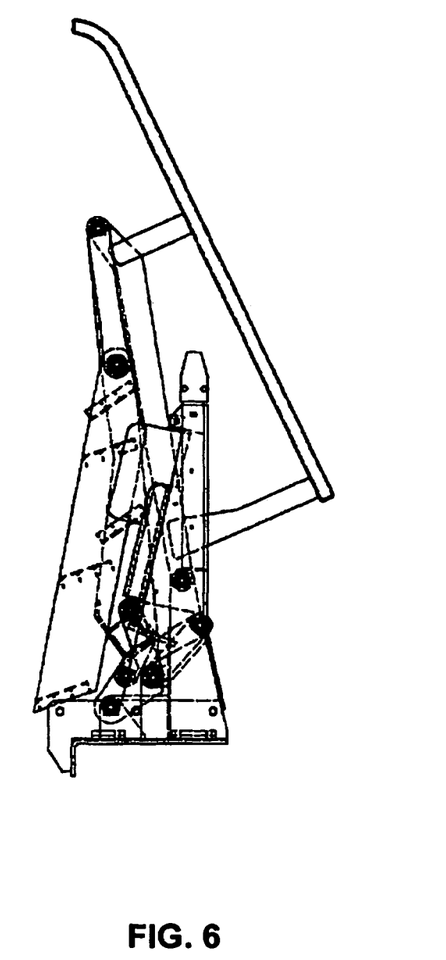
FIG. 6 illustrates the access device in the 'retracted' position.

Activation of the drive means 7 by a user effects movement of the device as shown by arrow 19 in FIG. 5, via the intermediate position shown in FIGS. 5 and 8, to the storage position shown in FIG. 6.

In the storage position, shown in FIG. 6 and FIG. 9, each of the first and second ladder members 5 and 6 respectively are retracted. The ladder members 5 and 6, in the retracted position, are provided in a substantially vertically disposed manner atop the mounting 4. In this position, the ladder members 5 and 6 have pivoted almost 180° relative to each other, from the access position.

Figure 8B:
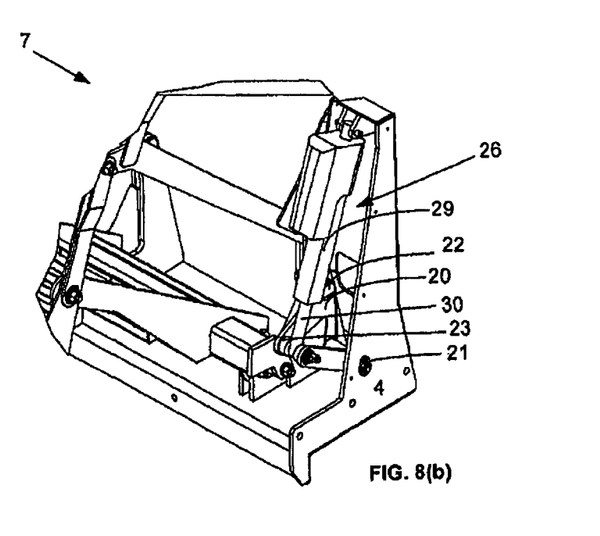
Figure 9B:
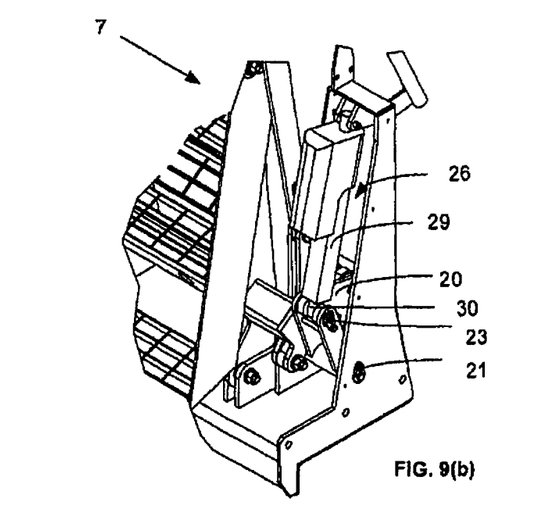

FIGS. 7(b), 8(b) and 9(b) illustrate detailed views of the drive means 7 in the access, intermediate and retracted positions, respectively.

The drive means 7 includes a rotatable member 20 having three pivotal connections 21, 22 and 23. The first of the connections 21 is attached to the mounting 4. The second of the connections 22 is attached to the first ladder member 5 by a control arm 24 at pivotal connection 25.

The third connector 23 is attached to the mounting 4 via an extendable arm arrangement 26. Contraction or extension of the extendible arm arrangement 26 will therefore cause the rotatable member 20 to rotate about pivot point 21. As the rotatable member 20 rotates about pivot point 21, this controls the movement of the first ladder member 5 as it is connected to the rotatable member 20.

Consequently, as the extendible arm 26 is extended or contracted, movement of the access device 1 between the access position shown in FIG. 7 via the intermediate position shown in FIG. 8 to the storage position shown in FIG. 9, and vice versa, is effected. The access device further includes one or more handrail(s) attached to either or both sides of the access device 1. In the embodiment shown, handrails 27 are attached to each side of the access device.

Figure 3A:
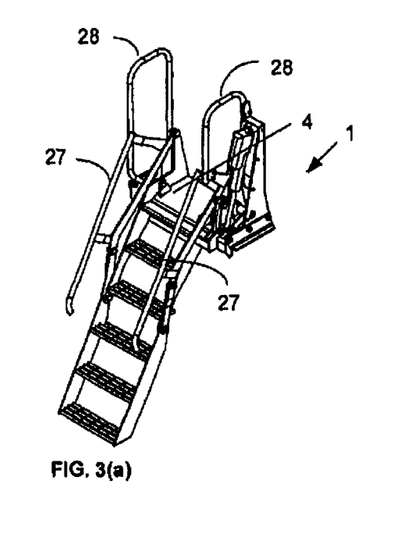
FIGS. 3(a), 3(b), 3(c) and 3(d) illustrate a perspective view, an elevational view, a top view and a front view of the access device, showing the upper handrail mounting not shown in FIGS. 1 and 2.
Figure 3B:
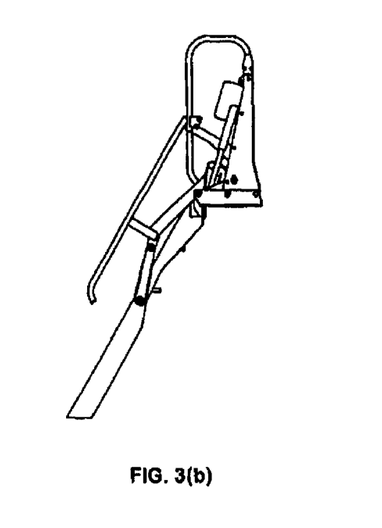
Figure 3C:
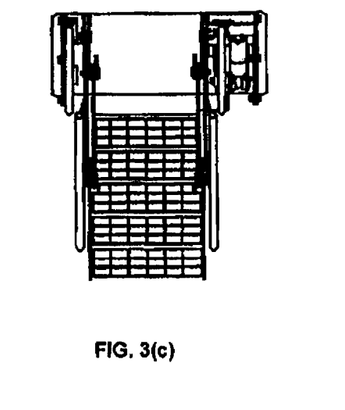
Figure 3D:
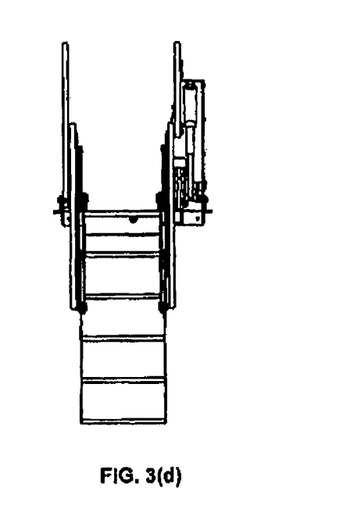

A further upper handrail may optionally be provided such as shown in FIG. 3(a), and indicated by reference numeral 28 on one or both sides of the access device 1. This upper handrail portion 28 may be provided permanently or removably atop the mounting plate 4 to provide additional support to a user ascending or descending the access device 1.

The drive means 7 shown in the drawings includes a cylinder and piston arrangement 29 and 30 respectively, which together make up the extendible arm 26. This drive means may be embodied as a hydraulic, pneumatic, electric cylinder or the like. Likewise, an alternative form of motor may be used to rotate the rotatable member 20 about pivot point 21.

The rotatable member 20 is shown of triangular shape. Provided the three connections 21, 22 and 23 are provided, the rotatable member may be of alternative overall shapes, eg. circular, star-shaped (three-pointed or otherwise) or of other functional shape.

It will therefore be appreciated by persons skilled in the art that the access device of the present invention is particularly useful for attaching to the top platform of vehicles such as a mining, earthmoving, railway or other like vehicle. The access device is provided, in its access position, at a suitably outwardly inclined angle, for ease of access of a user between a substrate surface and an elevated surface of the vehicle, whilst being able to be fully retracted atop the elevated surface in the storage position.

It will be appreciated by persons skilled in the art that numerous variations and modifications will become apparent to this invention. All such variations and modifications should be considered to fall within the spirit and scope of the invention as broadly hereinbefore described.

The invention claimed is:

1. An access device configured to provide a user access between a substrate surface and an elevated surface, the access device comprising:

a mounting comprising a lip extending downwardly from a planar mounting plate, the mounting being configured to rest atop and receive said elevated surface, and the mounting further comprising an extremity extending upwardly from the planar mounting plate toward a top end of the extremity;

a first ladder member comprising at least one first ladder stile and at least one first ladder rung, a first end of the first ladder member being operatively attached to said mounting via a drive mechanism, the drive mechanism including an extendible arm having first and second ends with a major length therebetween, the drive mechanism further including a triangular rotatable member having three pivotal connectors spaced apart in a triangular arrangement, the rotatable member being disposed between the planar mounting plate and the top end of the extremity, and the second end of the extendible arm is directly attached to the top end of the extremity at a height positioned entirely above the rotatable member;

a first of said connectors being pivotally attached to a bottom end of the extremity;

a second of said connectors being pivotally attached to said first ladder member via a control arm;

a third of said connectors being pivotally attached to the first end of the extendible arm so that the extendible arm extends downwardly from the top end of the extremity to the third connector when in and between an access position and a storage position, wherein the extendible arm is configured to be contracted and extended along said major length to cause said rotatable member to rotate about said first connector and consequently effect movement of said access device between said access and storage positions;

a second ladder member comprising at least one second ladder stile and at least one second ladder rung, and a first end of the second ladder member being pivotally attached to a second end of the first ladder member via an articulation joint;

at least one guide arm directly connected between said articulation joint and a pivot point of said mounting located above said planar mounting plate of said mounting, wherein the at least one guide arm is configured to guide a pivoting movement of said second ladder member with respect to said first ladder member as said drive mechanism moves said first ladder member; and, whereby said drive mechanism is configured to be operated by the user to control an operation of said access device between said access and storage positions, in which:

when in said access position, a first and second major longitudinal length of said first and second ladder members, respectively, are configured to be substantially linearly co-aligned to extend substantially outwardly and downwardly from said elevated surface; and, when in said storage position, each of said first and second ladder members are retracted in a substantially vertical manner disposed substantially atop said planar mounting plate.

2. The access device as claimed in claim 1, further including a handrail attached to said at least one guide arm.

3. The access device as claimed in claim 2, further comprising a curved handrail attached to the mounting.

4. The access device as claimed in claim 3, wherein a first end of the curved handrail is attached to the extremity.

5. The access device as claimed in claim 1, wherein said extendible arm includes a hydraulic, pneumatic or electric cylinder.

6. The access device as claimed in claim 1, wherein said device is attached to a mining, earthmoving, or railway vehicle.

7. The access device as claimed in claim 1, wherein, in said access position, said ladder members are capable of being each disposed at an angle between 60° and 75° relative to said substrate surface.

8. The access device as claimed in claim 1, wherein that at least one guide arm comprises a first guide arm pivotally connected to the mounting at the pivot point provided on the mounting, wherein the pivot point is disposed below the top end of the extremity and above the rotatable member.

9. The access device as claimed in claim 8, wherein the at least one guide arm comprises a second guide arm, wherein a first end of the second guide arm is pivotally connected to the first guide arm at a pivot point, and a distal second end of the second guide arm is pivotally connected to the second ladder member at the articulation joint.

10. A vehicle in combination with an access device configured to provide a user access between a substrate surface and an elevated surface of the vehicle, the vehicle comprising said elevated surface, and the access device comprising:

a mounting comprising a lip extending downwardly from a planar mounting plate, the mounting being configured to rest atop and receive said elevated surface, and the mounting further comprising an extremity extending upwardly from the planar mounting plate toward a top end of the extremity;

a first ladder member comprising at least one first ladder stile and at least one first ladder rung, a first end of the first ladder member being operatively attached to said mounting via a drive mechanism, the drive mechanism including an extendible arm having first and second ends with a major length therebetween, the drive mechanism further including a triangular rotatable member having three pivotal connectors spaced apart in a triangular arrangement, the rotatable member being disposed between the planar mounting plate and the top end of the extremity, and the second end of the extendible arm is directly attached to the top end of the extremity at a height positioned entirely above the rotatable member;

a first of said connectors being pivotally attached to a bottom end of the extremity;

a second of said connectors being pivotally attached to said first ladder member via a control arm;

a third of said connectors being pivotally attached to the first end of the extendible arm so that the extendible arm extends downwardly from the top end of the extremity to the third connector when in and between an access position and a storage position, wherein the extendible arm is configured to be contracted and extended along said major length to cause said rotatable member to rotate about said first connector and consequently effect movement of said access device between said access and storage positions;

a second ladder member comprising at least one second ladder stile and at least one second ladder rung, and a first end of the second ladder member being pivotally attached to a second end of the first ladder member via an articulation joint;

at least one guide arm directly connected between said articulation joint and a pivot point of said mounting located above said planar mounting plate of said mounting, wherein the at least one guide arm is configured to guide a pivoting movement of said second ladder member with respect to said first ladder member as said drive mechanism moves said first ladder member; and, whereby said drive mechanism is configured to be operated by the user to control an operation of said access device between said access and storage positions, in which:

when in said access position, a first and second major longitudinal length of said first and second ladder members, respectively, are configured to be substantially linearly co-aligned to extend substantially outwardly and downwardly from said elevated surface; and, when in said storage position, each of said first and second ladder members are retracted in a substantially vertical manner disposed substantially atop said planar mounting plate.

* * * * *